(12) United States Patent
Shido et al.

(10) Patent No.: US 11,135,970 B2
(45) Date of Patent: Oct. 5, 2021

(54) VEHICLE DISPLAY DEVICE, METHOD OF CONTROLLING VEHICLE DISPLAY DEVICE, AND COMPUTER-READABLE NON-TRANSITORY STORAGE MEDIUM

(71) Applicant: KOITO MANUFACTURING CO., LTD., Tokyo (JP)

(72) Inventors: Masaya Shido, Shizuoka (JP); Toru Ito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/615,432

(22) PCT Filed: May 9, 2018

(86) PCT No.: PCT/JP2018/017996
§ 371 (c)(1),
(2) Date: Nov. 21, 2019

(87) PCT Pub. No.: WO2018/216471
PCT Pub. Date: Nov. 29, 2018

(65) Prior Publication Data
US 2020/0172008 A1 Jun. 4, 2020

(30) Foreign Application Priority Data

May 23, 2017 (JP) .............................. JP2017-101470
Feb. 15, 2018 (JP) .............................. JP2018-024658

(51) Int. Cl.
*B60Q 1/50* (2006.01)
*B60Q 1/26* (2006.01)
(Continued)

(52) U.S. Cl.
CPC ........... *B60Q 1/503* (2013.01); *B60Q 1/2603* (2013.01); *G02F 1/133605* (2013.01);
(Continued)

(58) Field of Classification Search
CPC .. B60Q 1/503; B60Q 1/2603; B60Q 2400/10; G02F 1/133605; G02F 2001/133618; G09F 21/048
(Continued)

(56) References Cited

U.S. PATENT DOCUMENTS

2008/0191979 A1* 8/2008 Nakane ................ G09G 3/3413
345/87
2008/0297676 A1* 12/2008 Kimura ............... H01L 29/7869
349/39
(Continued)

FOREIGN PATENT DOCUMENTS

JP 10-170914 A 6/1998
JP 2001-43493 A 2/2001
(Continued)

OTHER PUBLICATIONS

International Search Report (PCT/ISA/210), issued by International Searching Authority in corresponding International Application No. PCT/JP2018/017996, dated Jul. 31, 2018.
(Continued)

*Primary Examiner* — Emily C Terrell
(74) *Attorney, Agent, or Firm* — Sughrue Mion, PLLC (57) ABSTRACT

A vehicle display device mounted on a vehicle and configured to display an image to an outside of the vehicle includes: a self-luminous display unit configured to display an image to the outside of the vehicle by emitting light emitted from a light source to the outside of the vehicle; a reflective display unit configured to display an image to the outside of the vehicle by reflecting light from the outside of the vehicle; an information acquisition unit configured to acquire environment information indicating an environment outside the vehicle; and a controller configured to switch between image display by the self-luminous display unit and
(Continued)

image display by the reflective display unit based on the acquired environment information.

11 Claims, 7 Drawing Sheets

(51) Int. Cl.
*G09F 21/04* (2006.01)
*G02F 1/13357* (2006.01)
*G02F 1/1335* (2006.01)

(52) U.S. Cl.
CPC ........ *G09F 21/048* (2013.01); *B60Q 2400/10* (2013.01); *G02F 1/133618* (2021.01)

(58) Field of Classification Search
USPC .......................................................... 340/468
See application file for complete search history.

(56) References Cited

U.S. PATENT DOCUMENTS

| 2009/0002586 | A1* | 1/2009 | Kimura ............. G02F 1/133621 |
| | | | 349/39 |
| 2009/0085729 | A1* | 4/2009 | Nakamura ........... B60Q 1/2665 |
| | | | 340/425.5 |
| 2010/0164702 | A1* | 7/2010 | Sasaki ..................... G01B 21/22 |
| | | | 340/438 |
| 2012/0033156 | A1* | 2/2012 | Yamazaki ......... G02F 1/133555 |
| | | | 349/62 |
| 2016/0332562 | A1* | 11/2016 | Kim ..................... B60Q 1/0076 |
| 2018/0118113 | A1* | 5/2018 | Sun .......................... B60R 1/00 |

FOREIGN PATENT DOCUMENTS

| JP | 2002-196705 A | 7/2002 |
| JP | 2006-146017 A | 6/2006 |
| JP | 2008-81048 A | 4/2008 |
| JP | 2014-234130 A | 12/2014 |

OTHER PUBLICATIONS

Written Opinion (PCT/ISA/237) issued by the International Searching Authority in corresponding International Application No. PCT/JP2018/017996, dated Jul. 31, 2018.

* cited by examiner

VEHICLE DISPLAY DEVICE, METHOD OF CONTROLLING VEHICLE DISPLAY DEVICE, AND COMPUTER-READABLE NON-TRANSITORY STORAGE MEDIUM

TECHNICAL FIELD

The present disclosure relates to a vehicle display device, a method of controlling the vehicle display device, a program, and a computer-readable storage medium in which the program is stored.

BACKGROUND ART

In the related art, in a normal vehicle operated by a driver, a stop lamp or a tail lamp, a direction indicator, and the like are manually operated in order to show a traveling state of the vehicle to other vehicles, pedestrians, or the like around the vehicle. In recent years, an automatic driving technique of a vehicle has been remarkably developed, and an environment is being put in place in which a situation in which various operations of the vehicle are substituted by an information processing unit included in the vehicle can occur. In the automatic driving technique, since the information processing unit operates the vehicle based on detection results of various sensors, complicated information can be instantaneously processed, and a traveling state and the like can be shown to other vehicles, pedestrians, or the like using an image display device.

In addition, it is desired to display information other than the traveling state, such as advertisement display or a decoration purpose to the outside of the vehicle. PTL 1 proposes a technique of providing an image display device in a vehicle and displaying various types of information to the outside of the vehicle.

CITATION LIST

Patent Literature

[PTL 1] JP-A-2001-043493

SUMMARY OF INVENTION

Technical Problem

When a display device is installed on an exterior of a vehicle as in PTL 1, there is a problem that visibility is greatly changed by an intensity of light emitted to the vehicle in an outside environment. In traveling at night, light emitted to the vehicle and the display device is weak, and it is suitable for the display device to emit light at luminance of about 100 to 300 cd/m$^2$ in order to visually recognize a screen well. On the other hand, in traveling at daytime, light emitted to the display device is strong, and it is necessary to emit light at luminance of about 2,000 to 10,000 cd/m$^2$. In particular, in a situation in which sunlight is directly emitted to the display device, it is difficult to visually recognize the screen without emitting light at higher luminance.

As the display device, a self-luminous display device such as a transmissive liquid crystal display device having a back light or an organic electro luminescence (EL) device is used to obtain luminance necessary for daytime and night, and visibility of the screen can also be ensured. However, in general, in the self-luminous display device, power consumption increases in proportion to a luminance value, and life also tends to shorten since the screen burns in, luminous efficiency decreases, or the like, so that it is not preferable to continue high luminance screen display at daytime.

The present disclosure provides a vehicle display device capable of reducing power consumption while improving visibility, a method of controlling the vehicle display device, a program, and a computer-readable storage medium.

Solution to Problem

According to one aspect of the present disclosure, there is provided a vehicle display device configured to mounted on a vehicle and to display an image to an outside of the vehicle.

A vehicle display device includes:

a self-luminous display unit configured to display an image to the outside of the vehicle by emitting light emitted from a light source to the outside of the vehicle;

a reflective display unit configured to display an image to the outside of the vehicle by reflecting light from the outside of the vehicle;

an information acquisition unit configured to acquire environment information indicating an environment outside the vehicle; and a controller configured to switch between image display by the self-luminous display unit and image display by the reflective display unit based on the acquired environment information.

According to one aspect of the present disclosure, a method of controlling a vehicle display device mounted on a vehicle and configured to display an image to an outside of the vehicle is provided.

The control method includes:

displaying an image using a self-luminous display unit configured to display an image to the outside of the vehicle by emitting light emitted from a light source to the outside of the vehicle;

displaying an image using a reflective display unit configured to display an image to the outside of the vehicle by reflecting light from the outside of the vehicle;

acquiring environment information indicating an environment outside the vehicle; and switching between image display by the self-luminous display unit and image display by the reflective display unit based on the acquired environment information.

DESCRIPTION OF EMBODIMENTS

First Embodiment

Figure 1:
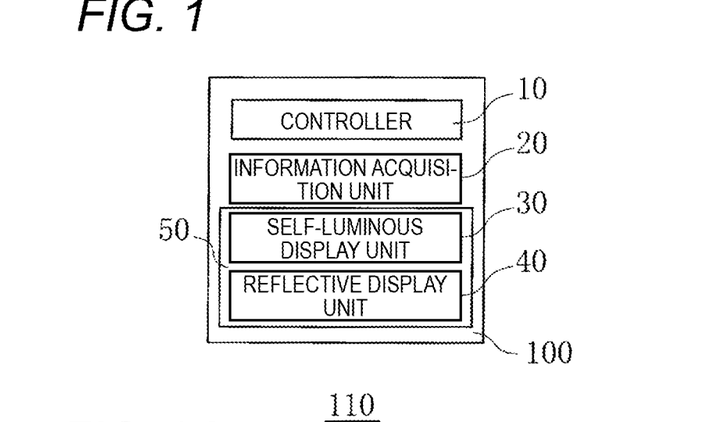
FIG. 1 is a block diagram showing a configuration of a vehicle display device in a first embodiment.

Hereinafter, a first embodiment will be described in detail with reference to the drawings. The same or equivalent constituent elements, members, and processing shown in the drawings are denoted by the same reference signs, and descriptions are not repeated appropriately. FIG. 1 is a block diagram showing a configuration of a vehicle display device 100 in the first embodiment. The vehicle display device 100 is mounted on a vehicle and is configured to present an image to the outside of the vehicle. The vehicle display device 100 includes a controller 10, an information acquisition unit 20, a self-luminous display unit 30, and a reflective display unit 40, and a display unit 50 is constituted by the self-luminous display unit 30 and the reflective display unit 40.

The controller 10 includes various arithmetic devices (for example, a processor such as a CPU and a GPU), an internal storage device (for example, a memory such as a ROM and a RAM), an external storage device (for example, a hard disk or a solid state drive (SSD)), and an information communication means (for example, a wireless or wired communication module). The controller 10 may be provided inside the vehicle display device 100, or may be provided outside the vehicle display device 100. For example, the controller 10 may be configured as a part of the information processing means that controls driving of the vehicle. The controller 10 is configured to switch display of the self-luminous display unit 30 and the reflective display unit 40 based on environment information showing an environment outside the vehicle display device 100 acquired by the information acquisition unit 20. That is, the controller 10 is configured to determine which of the self-luminous display unit 30 and the reflective display unit 40 should function based on the environment information. The controller 10 includes a display control circuit configured to control the display unit 50 so that an image is displayed on the display unit 50 including the self-luminous display unit 30 and the reflective display unit 40. In this regard, the display control circuit includes a first display control circuit configured to drive and control the self-luminous display unit 30 so that an image is generated by the self-luminous display unit 30, and a second display control circuit configured to drive and control the reflective display unit 40 so that an image is generated by the reflective display unit 40. A display control program (computer-readable command) for performing display control of the vehicle display device 100 may be stored in a memory (ROM or the like) or an external storage device (SSD or the like) of the controller 10. A processor of the controller 10 executes display control processing shown in FIG. 6 or FIG. 11 by loading the display control program on the RAM and executing the display control program by cooperation with the RAM. The display control program may be stored in the computer-readable storage medium such as a magnetic disk, an optical disk, a magneto-optical disk, and a flash memory. Further, the vehicle display device 100 may acquire the display control program through a server disposed on a communication network such as a LAN, a WAN, a RAN, or the Internet.

The information acquisition unit 20 is configured to acquire environment information showing an environment outside the vehicle display device 100 and transmit the acquired environment information to the controller 10. The environment information acquired by the information acquisition unit 20 includes, for example, at least one of luminance, temperature, position information including latitude and longitude, date and time information, vehicle proceeding direction information, vehicle speed information, and a lighting state of a vehicle lamp on a surface of the vehicle display device 100. As will be described later, the information acquisition unit 20 is a communication unit that communicates with a sensor or the outside that measures various types of information.

The self-luminous display unit 30 is configured to emit light from a light source (not shown) provided inside the vehicle display device 100 to the outside, and to display an image by using the emitted light. The self-luminous display unit 30 includes, a transmissive liquid crystal display device that transmits light from a back light source, an organic EL (OLED) display device, a display device in which a plurality of light emitting diodes (LEDs) are disposed, and a field emission display (FED) device, and the like.

The reflective display unit 40 is configured to reflect light from the outside of the vehicle display device 100 and to display an image using the reflected light. The reflective display unit 40 is, for example, a reflective liquid crystal display device in which a reflective mirror is disposed on a back surface, or an electronic paper device.

The display unit 50 includes the self-luminous display unit 30 and the reflective display unit 40, and is configured to display an image. Image display by the display unit 50 is controlled by the controller 10, and self-luminous drawing that displays an image using the self-luminous display unit 30 and reflective drawing that displays an image using the reflective display unit 40 are switched. When the images displayed on the self-luminous display unit 30 and the reflective display unit 40 are the same image, the same image can be visually recognized even the self-luminous display unit 30 and the reflective display unit 40 are switched. The image displayed by the display unit 50 may be a still image or a moving image that changes over time.

Figure 2A:
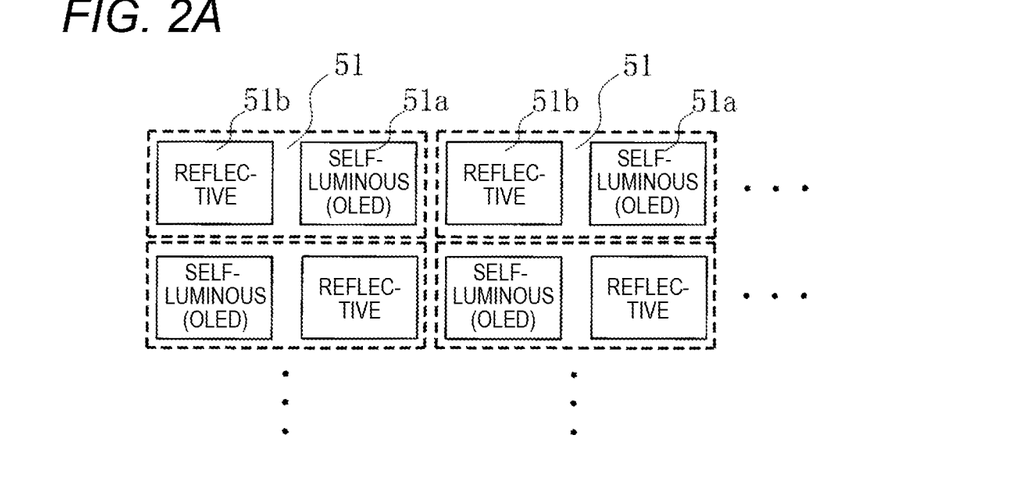
FIG. 2A shows a self-luminous display unit and a reflective display unit disposed in a matrix shape.
Figure 2B:
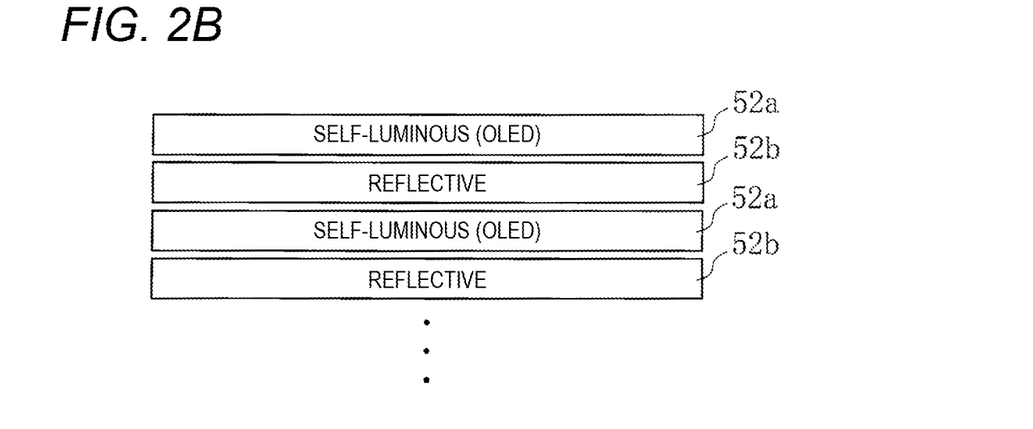
FIG. 2B shows the self-luminous display unit and the reflective display unit disposed in a stripe shape.

Examples of the display unit 50 constituted by the self-luminous display unit 30 and the reflective display unit 40 include a semi-transmissive liquid crystal display device in which the transmissive liquid crystal display device and the reflective liquid crystal display device are combined, or a hybrid display device that transmits light from the organic EL display device provided on a back surface by providing an opening portion on a reflective electrode of the reflective liquid crystal display device. FIGS. 2A and 2B are a schematic view showing disposition of the self-luminous display unit 30 and the reflective display unit 40 in the display unit 50. FIG. 2A shows the self-luminous display unit 30 and the reflective display unit 40 disposed in a matrix shape. FIG. 2B shows the self-luminous display unit 30 and the reflective display unit 40 disposed in a stripe shape.

In the display unit 50 shown in FIG. 2A, pixels 51 are disposed in a matrix shape, and a self-luminous pixel 51*a* of the self-luminous display unit 30 and a reflective pixel 51*b* of the reflective display unit 40 are included in each pixel 51, and are disposed adjacent to each other. The self-luminous pixel 51*a* and the reflective pixel 51*b* in each pixel 51 constitute the same position of the image displayed on the display unit 50. Therefore, an image can be formed even in a set of the self-luminous pixels 51*a*, and an image can be formed even in a set of the reflective pixels 51*b*.

In the display unit 50 shown in FIG. 2B, the self-luminous pixels 52*a* arranged in a row direction of the self-luminous display unit 30 and the reflective pixels 52*b* arranged in a row direction of the reflective display unit 40 are alternately disposed in a column direction. Each of the self-luminous pixels 52*a* and the reflective pixels 52*b* is a stripe in which pixels constituting the self-luminous display unit 30 and the reflective display unit 40 are arranged in the row direction, and displays row direction elements of the image displayed on the display unit 50. Therefore, an image can be formed even in the set of the self-luminous pixels 52*a*, and an image can be formed even in the set of the reflective pixels 52*b*. Although FIG. 2A shows an example in which the self-luminous pixels 52*a* and the reflective pixels 52*b* are arranged in the column direction, large stripe-shaped pixels may be arranged alternately.

Figure 3A:
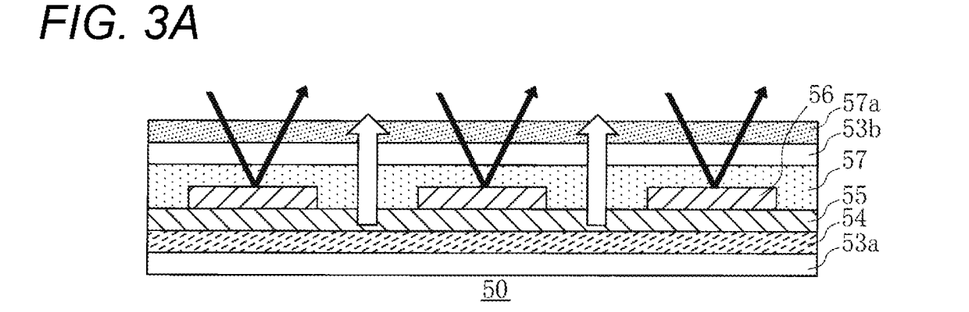
FIG. 3A shows a schematic sectional view of a display unit including an organic EL element and a reflective liquid crystal display device.
Figure 3B:
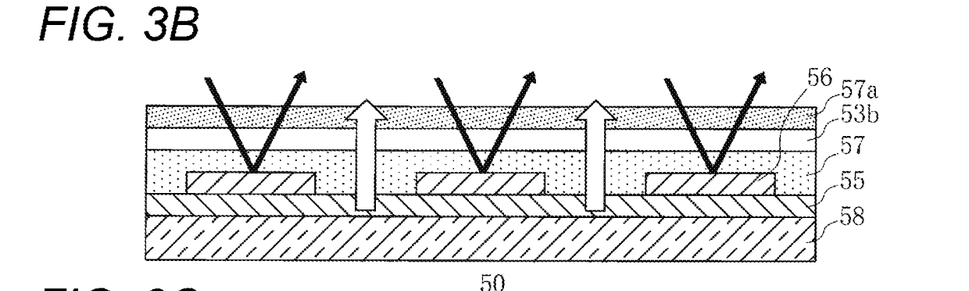
FIG. 3B shows a schematic sectional view of a display unit including the reflective liquid crystal display device and a back light.
Figure 3C:
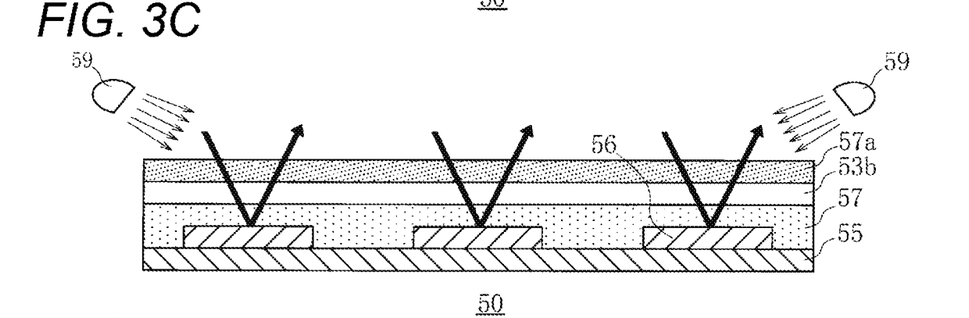
FIG. 3C shows a schematic sectional view of a display unit including the reflective liquid crystal display device and an outside light.

FIGS. 3A to 3C are a schematic sectional view showing a structure example of the display unit 50. FIG. 3A shows a schematic sectional view of the display unit 50 including an organic EL element and a reflective liquid crystal display device. FIG. 3B shows a schematic sectional view of the display unit 50 including the reflective liquid crystal display device and a back light. FIG. 3C shows a schematic sectional view of the display unit 50 including the reflective liquid crystal display device and an outside light. Although the organic EL element is shown as a self-luminous element in FIG. 3A, an LED element disposed in a matrix shape may be used as the self-luminous element.

FIG. 3A is a schematic sectional view showing the display unit 50 including an organic EL element and a reflective liquid crystal display device. In this example, the display unit 50 includes transparent substrates 53*a* and 53*b*, an organic EL layer 54, a drive circuit layer 55, a reflective electrode 56, a liquid crystal layer 57, and a color filter layer 57*a*.

The transparent substrates 53*a* and 53*b* are flat plate-shaped members transmitting light and have a rigidity of a degree that can hold other members. The transparent substrate 53*a* may be made of an opaque material as long as the material can hold other members. The organic EL layer 54 has an electrode or an organic EL element structure (not shown), and is a layer that emits light by itself as the organic EL element. The drive circuit layer 55 is a layer configured to drive and control the liquid crystal layer 57. The reflective electrode 56 is partially provided on the drive circuit layer 55, and is made of a metal that reflects light. The liquid crystal layer 57 is a layer filled with a liquid crystal material between the drive circuit layer 55 and the transparent substrate 53*b*. In the liquid crystal layer 57, orientation of the liquid crystal changes according to the applied voltage, and transmittance of light is controlled. The color filter layer 57*a* is a layer that selectively transmits a wavelength of light transmitted through the liquid crystal layer 57, and a filter of each RGB color is provided for each pixel.

Light emitted from the organic EL layer 54 passes through a region where the reflective electrode 56 is not formed, is transmitted through the liquid crystal layer 57 and a transparent substrate 53*b*, and is output to the outside. In this way, a region where the reflective electrode 56 is not formed functions as the self-luminous display unit 30.

Light emitted from the outside of the display unit 50 is transmitted through the transparent substrate 53*b* and the liquid crystal layer 57, is reflected by the reflective electrode 56, is transmitted through the liquid crystal layer 57 and the transparent substrate 53*b*, and is output to the outside again. In this way, the region where the reflective electrode 56 is formed functions as the reflective display unit 40.

FIG. 3B shows a schematic sectional view of the display unit 50 including the reflective liquid crystal display device and a back light. In this example, the display unit 50 includes the transparent substrate 53*b*, the drive circuit layer 55, the reflective electrode 56, the liquid crystal layer 57, the color filter layer 57*a*, and a back light 58.

Light emitted from the back light 58 passes through a region where the reflective electrode 56 is not formed, is transmitted through the liquid crystal layer 57 and the transparent substrate 53*b*, and is output to the outside. In this way, a region where the reflective electrode 56 is not formed functions as the self-luminous display unit 30. Function of the reflective display unit 40 is the same as that described above.

FIG. 3C shows a schematic sectional view of the display unit 50 including the reflective liquid crystal display device and an outside light. In this example, the display unit 50 includes the transparent substrate 53*b*, the drive circuit layer 55, the reflective electrode 56, the liquid crystal layer 57, the color filter layer 57*a*, and an outside light 59.

Light emitted from the outside light 59 is transmitted through the transparent substrate 53*b* and the liquid crystal layer 57, then is reflected by the reflective electrode 56, is transmitted through the liquid crystal layer 57 and the transparent substrate 53*b*, and is output to the outside again. In this way, when the outside light 59 is turned on, the region where the reflective electrode 56 is formed functions as the reflective display unit 40. Function of the reflective display unit 40 is the same as that described above.

Figure 4:
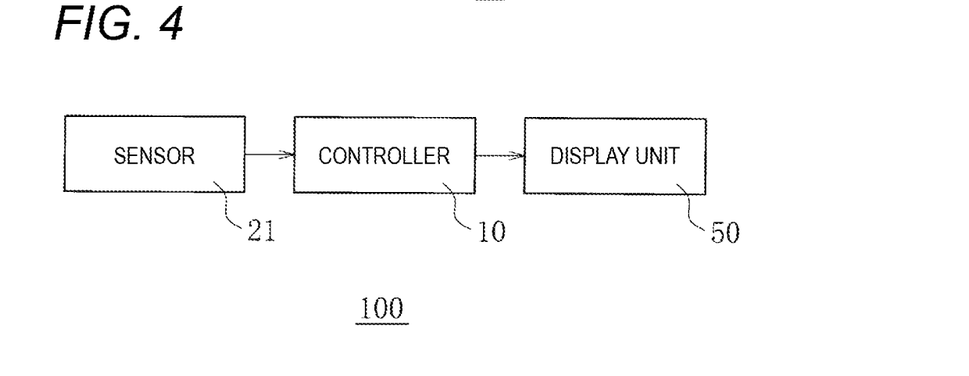
FIG. 4 is a block diagram showing a vehicle display device including a sensor as an information acquisition unit.
Figure 5:
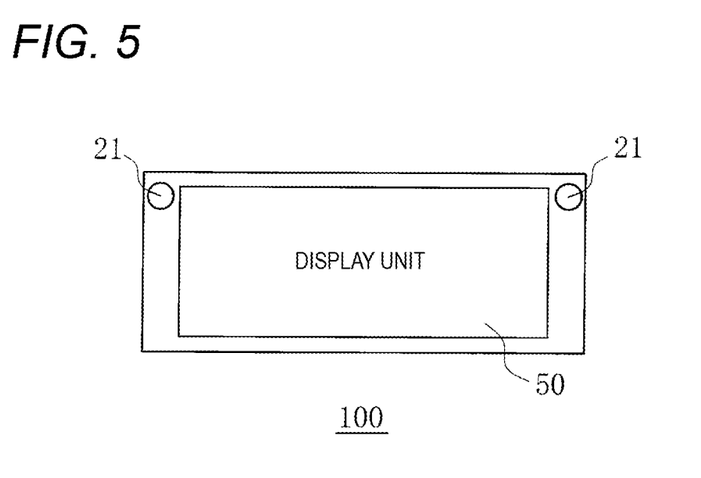
FIG. 5 is a schematic plan view showing an outline of the vehicle display device in the first embodiment.

FIG. 4 is a block diagram showing a vehicle display device 100 including a sensor 21 as an information acquisition unit 20. FIG. 5 is a schematic plan view showing an outline of the vehicle display device 100 in the first embodiment. As shown in FIGS. 4 and 5, in the vehicle display device 100, a sensor 21 is provided as the information acquisition unit 20 around the display unit 50 including the self-luminous display unit 30 and the reflective display unit 40.

The sensor 21 is disposed around the display unit 50 and is configured to acquire information of an outside environment. The sensor 21 includes, for example, at least one of a luminance sensor, a temperature sensor, and a global positioning system (GPS) sensor. The sensor 21 is communicably connected to the controller 10, and transmits the measured information of the outside environment to the controller 10. The controller 10 switches display of the self-luminous display unit 30 and display of the reflective display unit 40 based on the transmitted environment information. In an example shown in FIG. 5, the sensor 21 is disposed around the display unit 50 as a separate body from the display unit 50, but pixels included in the self-luminous display unit 30 may be used as an outside light sensor, and the sensor 21 may be disposed in a display region of the display unit 50.

Figure 6:
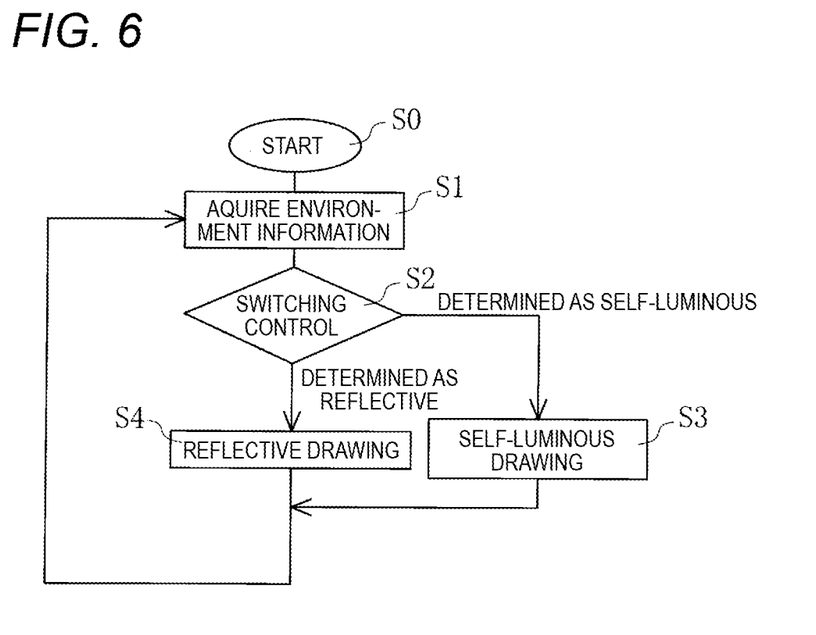
FIG. 6 is a flowchart showing a method of driving the vehicle display device.

FIG. 6 is a flowchart showing a method of driving the vehicle display device 100. In the vehicle display device 100, a processor of the controller 10 executes a display control program (computer-readable command) read into a memory such as a RAM of the controller 10 to control driving of the vehicle display device 100.

As shown in FIG. 6, in step S1, the controller 10 acquires environment information outside the vehicle from the information acquisition unit 20. In this step, the controller 10 may control the information acquisition unit 20 to acquire environment information. The information acquisition unit 20 may acquire the environment information periodically or irregularly, and transmit the acquired environment information to the controller 10. After the controller 10 acquires the environment information, the processing proceeds to step S2.

In step S2, the controller 10 determines which of image display by the self-luminous display unit 30 and image display by the reflective display unit 40 should be adopted based on the acquired environment information. In this step, when the controller 10 determines that the image display by the self-luminous display unit 30 should be adopted depending on comparison between determination conditions and environment information recorded in advance in a memory or the like of the controller 10, the processing proceeds to step S3. On the other hand, when the controller 10 determines that the image display by the reflective display unit 40 should be adopted depending on comparison between determination conditions and environment information recorded in advance in a memory or the like of the controller 10, the processing proceeds to step S4. For example, a case is considered, in which the environment information indicates luminance of outside light emitted from the outside of the vehicle to a display surface of the display unit 50. In this case, when it is determined that the luminance of the outside light is equal to or greater than a predetermined value, the controller 10 determines that the image display by the self-luminous display unit 30 should be adopted (self-luminous determination) after judging that it is at daytime. On the other hand, when it is determined that the luminance of the outside light is less than a prescribed value, the controller 10 determines that the image display by the reflective display unit 40 should be adopted (reflective determination) after judging that it is at night.

In step S3, the controller 10 performs image display using the self-luminous display unit 30. At this time, the controller 10 may control the luminance of the image display by the self-luminous display unit 30 based on the environment information. For example, when the environment information indicates the luminance of the outside light emitted from the outside of the vehicle to the display surface of the display unit 50, the controller 10 may display a high luminance image by strengthening light emission of the self-luminous display unit 30 depending on increase in the luminance of the outside light. Luminance of self-luminous drawing using the self-luminous display unit 30 is, for example, about 300 cd/m$^2$. The luminance of self-luminous drawing using the self-luminous display unit 30 is preferably lower than that of a marker lamp in view of satisfying regulations related to the vehicle. After the controller 10 executes the image display by the self-luminous display unit 30, the processing proceeds to step S1 again.

In step S4, the controller 10 performs image display using the reflective display unit 40. After the controller 10 executes the image display by the reflective display unit 40, the processing proceeds to step S1 again.

Figures 7A, 7B:
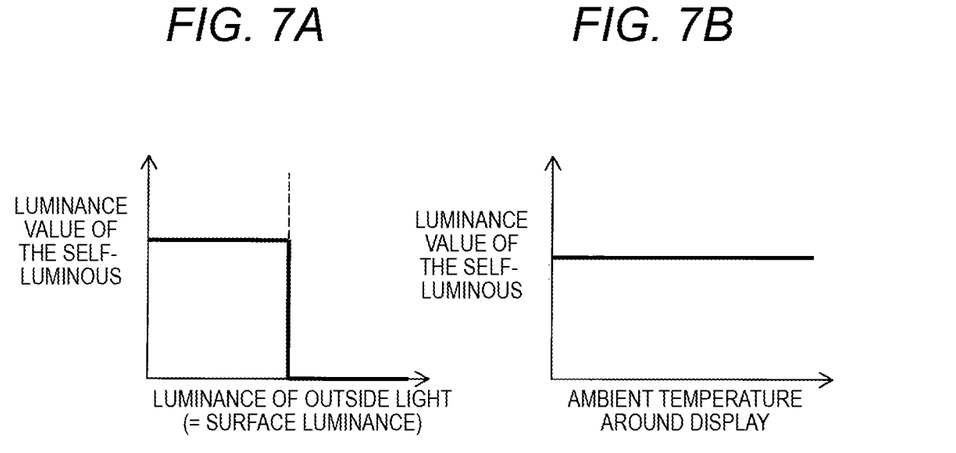
FIG. 7A is a graph showing a boundary of switching control in the first embodiment, and shows a relationship between surface luminance and the luminance of the self-luminous display unit.
FIG. 7B is a graph showing a boundary of switching control in the first embodiment, and shows a relationship between ambient temperature and luminance of the self-luminous display unit.

FIGS. 7A and 7B are a graph showing a boundary of switching control in the first embodiment. FIG. 7A shows a relationship between surface luminance and luminance of the self-luminous display unit 30. FIG. 7B shows a relationship between ambient temperature and the luminance of the self-luminous display unit 30. In the present embodiment, a luminance sensor and a temperature sensor are used as the sensor 21. The luminance sensor is configured to measure the luminance (surface luminance) of the outside light emitted to the display surface of the display unit 50 as environment information. The temperature sensor is configured to measure an ambient temperature indicating a temperature around the display unit 50.

In FIG. 7A, a vertical axis indicates the luminance of the self-luminous display unit 30, and a horizontal axis indicates the surface luminance A region in which the surface luminance is lower than a predetermined value is defined as a self-luminous region. In the self-luminous region, the controller 10 performs image display by the self-luminous display unit 30 while keeping the luminance of the self-luminous display unit 30 constant. A region having surface luminance greater than or equal to a predetermined value is defined as a reflective region. In the reflective region, the controller 10 sets a luminance value of the self-luminous display unit 30 to 0 and performs image display by the reflective display unit 40.

In FIG. 7B, a vertical axis indicates luminance of the self-luminous display unit 30, and a horizontal axis indicates the ambient temperature of the display unit 50. As shown in FIG. 7B, the controller 10 performs image display by the self-luminous display unit 30 at luminance determined in FIG. 7A regardless of the ambient temperature.

In step S2 of FIG. 6, the controller 10 determines whether the vehicle display device 100 belongs to the self-luminous region or the reflective region depending on comparison between determination criteria and environment information shown in FIGS. 7A and 7B. When it is determined that the vehicle display device 100 belongs to the self-luminous region, the controller 10 performs image display using the self-luminous display unit 30. At this time, luminance of light emitted from a light source of the self-luminous display unit 30 to the outside may be constant as shown in FIG. 7A, or may be changed depending on the surface luminance.

The above-described steps S1 to S4 are repeatedly executed. In this way, the vehicle display device 100 can switch between the self-luminous drawing by the self-luminous display unit 30 and the reflective drawing by the reflective display unit 40 based on current environment information. Accordingly, in a bright environment at daytime, power consumption of the vehicle display device 100 can be reduced by employing the image display by the reflective display unit 40. On the other hand, in a dark environment at night, power consumption of the vehicle display device 100 can be reduced while visibility of the vehicle display device 100 from a pedestrian or another vehicle present outside the vehicle is ensured by adopting the image display by the self-luminous display unit 30.

Second Embodiment

Figures 8A, 8B:
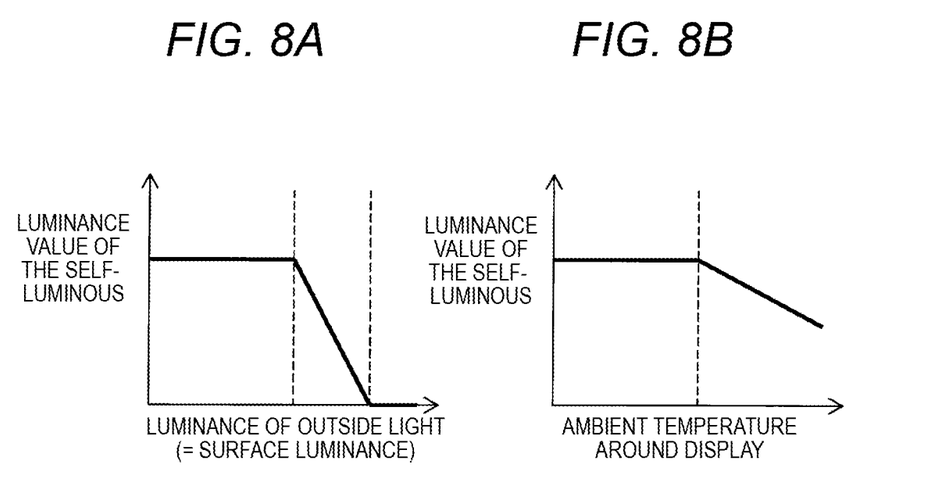
FIG. 8A is a graph showing a boundary of switching control in a second embodiment, and shows a relationship between surface luminance and luminance of a self-luminous display unit 30.
FIG. 8B is a graph showing a boundary of switching control in a second embodiment, and shows a relationship between ambient temperature and the luminance of the self-luminous display unit 30.

Next, a second embodiment will be described with reference to FIGS. 8A and 8B. In description of the second embodiment, the same contents as those in the first embodiment will not be described. FIGS. 8A and 8B are a graph showing a boundary of switching control in the second embodiment. In particular, FIG. 8A shows a relationship between the surface luminance and the luminance of the self-luminous display unit 30. FIG. 8B shows a relationship between the ambient temperature and the luminance of the self-luminous display unit 30. In the present embodiment, a luminance sensor and a temperature sensor are used as the sensor 21 similarly. The luminance sensor is configured to measure the luminance of the outside light emitted to the display surface of the display unit 50 as environment information. The temperature sensor is configured to measure an ambient temperature indicating a temperature around the display unit 50.

In FIG. 8A, a vertical axis indicates the luminance of the self-luminous display unit 30, and a horizontal axis indicates the surface luminance A region in which the surface luminance is lower than a predetermined value is defined as a self-luminous region. In the self-luminous region, the controller 10 performs image display using the self-luminous display unit 30. At this time, when the surface luminance is less than or equal to a first surface luminance value, the luminance value of the self-luminous display unit 30 is constant. On the other hand, when the surface luminance is within a range from a first surface luminance value to a second surface luminance value, the luminance value of the self-luminous display unit 30 is reduced. A region having the second surface luminance value or more is defined as a reflective region. In the reflective region, the controller 10 sets a luminance value of the self-luminous display unit 30 to 0 and performs image display by the reflective display unit 40.

In FIG. 8B, a vertical axis indicates the luminance of the self-luminous display unit 30, and a horizontal axis indicates the ambient temperature of the display unit 50. As shown in FIG. 8B, when the ambient temperature is lower than or equal to a predetermined value, the ambient temperature of the controller 10 performs image display by the self-luminous display unit 30 at luminance determined in FIG. 8A. On the other hand, when the ambient temperature is higher than the predetermined ambient temperature, the controller 10 decreases the luminance of the self-luminous display unit 30 by multiplying the luminance value obtained in FIG. 8A by a coefficient.

In step S2 of FIG. 6, the controller 10 determines whether an environment of the vehicle display device 100 belongs to the self-luminous region or the reflective region depending on comparison between determination criteria and environment information shown in FIGS. 8A and 8B. When it is determined that the vehicle display device 100 belongs to the self-luminous region, the controller 10 performs image display using the self-luminous display unit 30. On the other hand, when the surface luminance exceeds the second surface luminance value as shown in FIG. 8A, and when the ambient temperature becomes high as shown in FIG. 8B so that the luminance value of the self-luminous display unit 30 becomes 0, the controller 10 performs image display using the reflective display unit 40.

Similarly, in the present embodiment, in a bright environment at daytime, power consumption of the vehicle display device 100 can be reduced by employing the image display by the reflective display unit 40. On the other hand, in a dark environment at night, power consumption of the vehicle display device 100 can be reduced while visibility of the vehicle display device 100 from a pedestrian or another vehicle present outside the vehicle is ensured by adopting the image display by the self-luminous display unit 30. Further, when the ambient temperature of the vehicle display device 100 is high, since an upper limit of display luminance in the self-luminous display unit 30 is low, the self-luminous display unit 30 is prevented from being driven by a large current in a high-temperature environment. In this way, deterioration of the display unit 50 can be prevented.

Third Embodiment

Next, a third embodiment will be described with reference to FIGS. 9A to 9D. In description of the third embodiment, the same contents as those in the first embodiment will not be described. In the present embodiment, a part of the image displayed on the display unit 50 is used as a marker lamp. Further, the controller 10 changes area and luminance of the marker lamp part in the self-luminous display unit 30 depending on the environment information acquired by the information acquisition unit 20. In a region of the display region of the display unit 50 that is not used as a marker lamp, display control similar to that of the first embodiment or the second embodiment is applied.

Figure 9A:
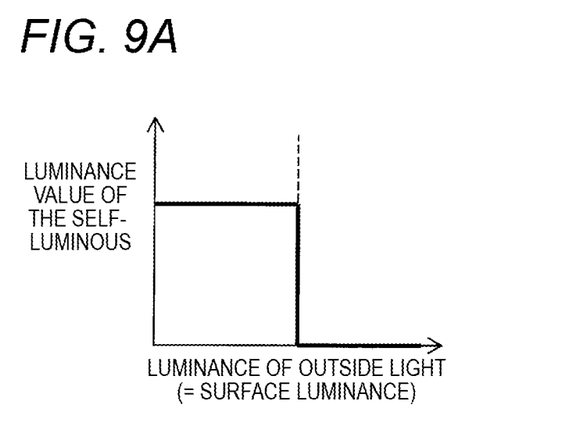
FIG. 9A is a graph showing control of a self-luminous display unit in a third embodiment, and shows a relationship between surface luminance and luminance of a self-luminous display unit.
Figure 9B:
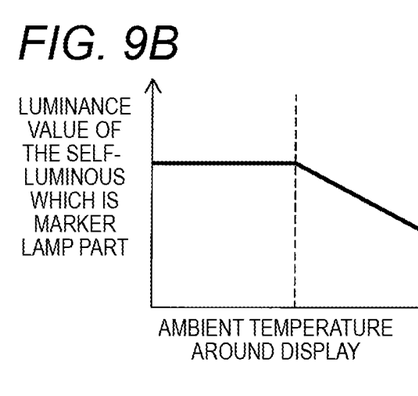
FIG. 9B is a graph showing control of a self-luminous display unit in a third embodiment, and shows a relationship between ambient temperature and luminance of a marker lamp part.
Figure 9C:
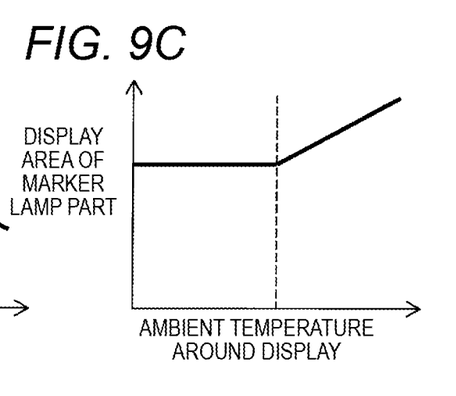
FIG. 9C is a graph showing control of a self-luminous display unit in a third embodiment, and shows a relationship between the ambient temperature and an area of the marker lamp part.
Figure 9D:
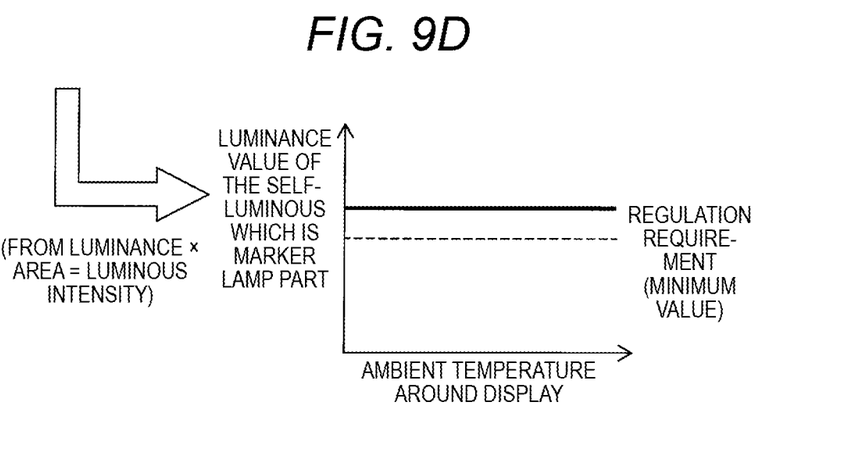
FIG. 9D is a graph showing control of a self-luminous display unit in a third embodiment, and shows a relationship between the ambient temperature and a luminous intensity value of the marker lamp part.

FIGS. 9A and 9B are a graph showing control of the self-luminous display unit 30 in the third embodiment. In particular, FIG. 9A shows a relationship between the surface luminance and the luminance of the self-luminous display unit 30. FIG. 9B shows a relationship between ambient temperature and luminance of a marker lamp part. FIG. 9C shows a relationship between the ambient temperature and an area of the marker lamp part. FIG. 9D shows a relationship between the ambient temperature and a luminous intensity value of the marker lamp part. In the present embodiment, a luminance sensor and a temperature sensor are used as the sensor 21 similarly. The luminance sensor is configured to measure the luminance of the outside light emitted to the display surface of the display unit 50 as environment information. The temperature sensor is configured to measure the ambient temperature around the display unit 50.

In FIG. 9A, a vertical axis indicates the luminance of the self-luminous display unit 30, and a horizontal axis indicates the surface luminance. A region in which the surface luminance is lower than a predetermined value is defined as a self-luminous region. In the self-luminous region, the controller 10 performs image display while keeping the luminance of the self-luminous display unit 30 constant. A region having surface luminance greater than or equal to a predetermined value is defined as a reflective region. In the reflective region, the controller 10 sets a luminance value of the self-luminous display unit 30 to 0 and performs image display by the reflective display unit 40.

In FIG. 9B, a vertical axis indicates the luminance of the self-luminous display unit 30 of the marker lamp part, and a horizontal axis indicates the ambient temperature of the display unit 50. As shown in FIG. 9B, when the ambient temperature is lower than or equal to the predetermined ambient temperature, the luminance value of the self-luminous display unit 30, which is the marker lamp part, is constant. On the other hand, when the ambient temperature exceeds the predetermined ambient temperature, the luminance value of the self-luminous display unit 30, which is the marker lamp part, is reduced.

In FIG. 9C, a vertical axis indicates area of the self-luminous display unit 30 of the marker lamp part, and a horizontal axis indicates the ambient temperature of the display unit 50. As shown in FIG. 9C, when the ambient temperature is lower than or equal to the predetermined ambient temperature, display area of the self-luminous display unit 30, which is the marker lamp part, is constant. On the other hand, when the ambient temperature exceeds a predetermined ambient temperature, area of the marker lamp part is increased.

In FIG. 9C, a vertical axis indicates a luminous intensity value of the self-luminous display unit 30 of the marker lamp part, and a horizontal axis indicates the ambient temperature of the display unit 50. Since the luminous intensity value of the marker lamp part in the self-luminous display unit 30 is a value obtained by multiplying the luminance and the area, the luminous intensity value can be made constant regardless of the ambient temperature. At this time, the luminous intensity value of the marker lamp part is set so as to satisfy a regulation requirement.

In step S3 shown in FIG. 6, the controller 10 changes the area and luminance of the marker lamp part in the self-luminous display unit 30 depending on comparison between determination criteria and environment information shown in FIGS. 9A to 9D. When the surface luminance is high, the luminance is kept constant to increase the area of the marker lamp part, so that a luminous intensity which is a regulation requirement is satisfied, and visibility is secured even under sunlight at daytime. In addition, since the luminous intensity can be secured while keeping the luminance constant, power consumption per unit area of the self-luminous display unit 30 does not increase, and deterioration of the display unit 50 is prevented. In this way, durability of the vehicle display device 100 can be improved, and a lifetime of the vehicle display device 100 can be extended.

When the ambient temperature is high, the area of the marker lamp part is enlarged, and the luminance of the self-luminous display unit 30 is lowered to satisfy the luminous intensity which is a regulation requirement. In this way, since deterioration of the display unit 50 is prevented, durability of the vehicle display device 100 can be improved, and a lifetime of the vehicle display device 100 can be extended.

Similarly, in the present embodiment, in a bright environment at daytime, power consumption of the vehicle display device 100 can be reduced by employing the image display by the reflective display unit 40. On the other hand, in a dark environment at night, power consumption of the vehicle display device 100 can be reduced while visibility of the vehicle display device 100 from a pedestrian or another vehicle present outside the vehicle is ensured by adopting the image display by the self-luminous display unit 30. In addition, a part of the display unit 50 is used as a marker lamp, and the area and luminance of the marker lamp part are controlled based on the environment information. In this way, it is possible to reduce power consumption of the vehicle display device 100 and prolong the lifetime while ensuring the visibility of the vehicle display device 100 so as to satisfy a regulation requirement related to the marker lamp part.

Fourth Embodiment

Figure 10:
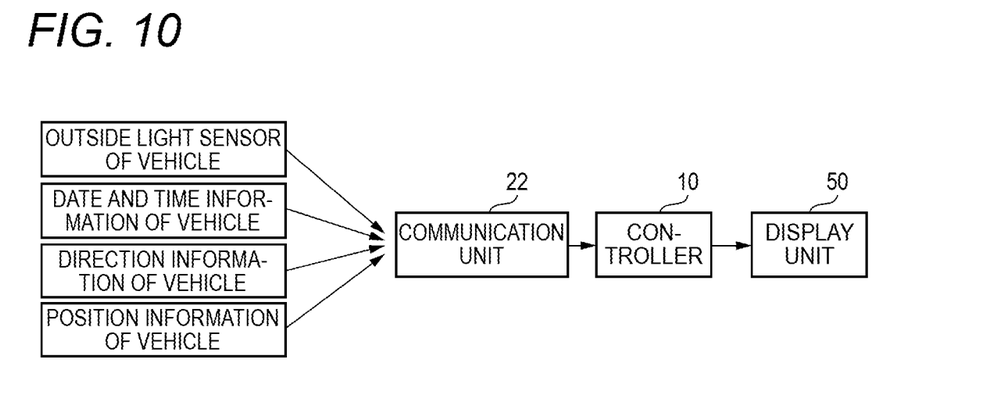
FIG. 10 is a block diagram showing a configuration of a vehicle display device in a fourth embodiment.

Next, a fourth embodiment will be described with reference to FIG. 10. In the description of the fourth embodiment, the same contents as those in the first embodiment will not be described. FIG. 10 is a block diagram showing a configuration of the vehicle display device 110 in the fourth embodiment. In the present embodiment, similarly to the first embodiment, the vehicle display device 110 includes a controller 10, a communication unit 22, and a display unit 50.

The communication unit 22 (an example of the information acquisition unit) is mounted inside the vehicle display device 110, and is configured to perform communication with the outside by wireless or wired communication. The communication unit 22 acquires environment information outside the vehicle and transmits the environment information to the controller 10 by wireless or wired communication. An example of the communication unit 22 is a wireless communication module including a transmission/reception circuit and an antenna. For example, an outside light sensor or a clock mounted on the vehicle, a GPS device, a computer that controls operation of the vehicle, and the like transmit environment information to the communication unit 22.

Similarly, in the vehicle display device 100, a processor of the controller 10 executes a display control program (computer-readable command) read into a memory such as a RAM of the controller 10 to execute the processing shown in FIG. 6. In the present embodiment, in step S1, the communication unit 22 acquires the environment information instead of the information acquisition unit 20, and transmits the acquired environment information to the controller 10. After the controller 10 acquires the environment information, the processing proceeds to step S2.

Similarly, in the present embodiment, in a bright environment at daytime, power consumption of the vehicle display device 100 can be reduced by employing the image display by the reflective display unit 40. On the other hand, in a dark environment at night, power consumption of the vehicle display device 100 can be reduced while visibility of the vehicle display device 100 from a pedestrian or another vehicle present outside the vehicle is ensured by adopting the image display by the self-luminous display unit 30. Further, a means (a sensor or the like) that measures environment information is provided outside the vehicle display device 110. Further, the controller 10 acquires the environment information via the communication unit 22. In this way, since the number of components of the vehicle display device 110 can be reduced, the weight and thickness of the vehicle display device 100 can be reduced.

Fifth Embodiment

Figure 11:
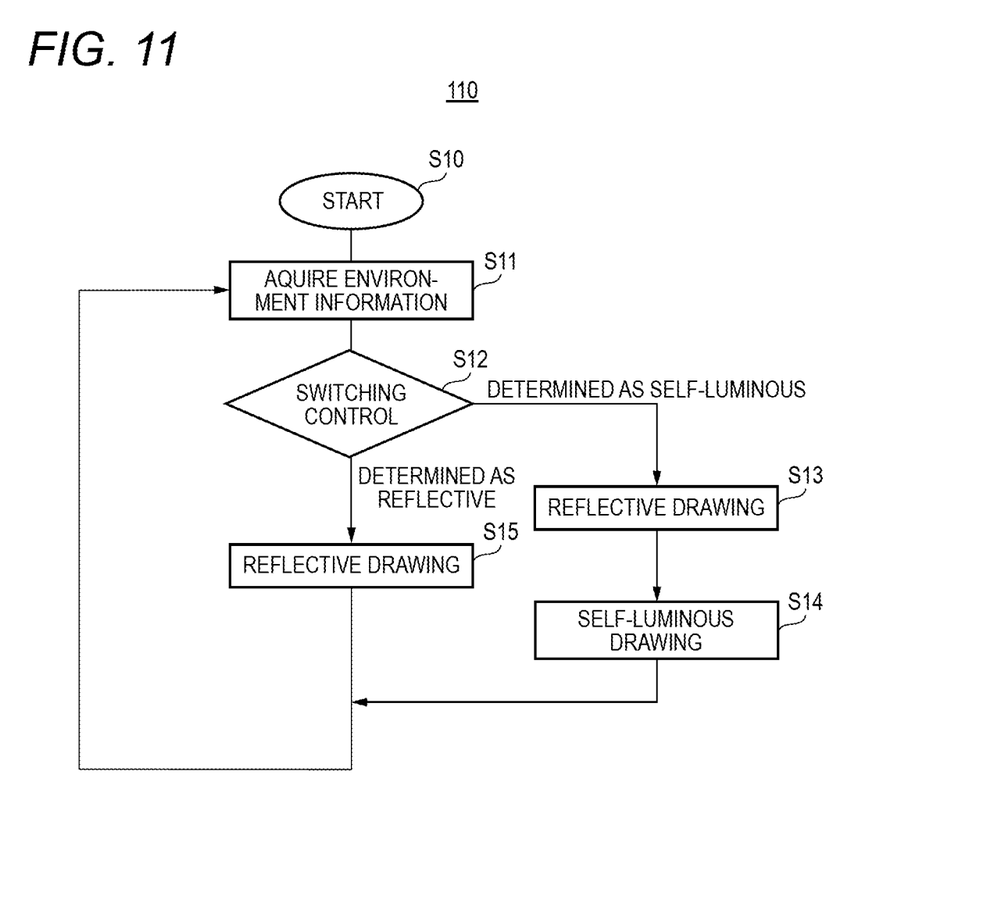
FIG. 11 is a flowchart showing a method of driving a vehicle display device in a fifth embodiment.

Next, a fifth embodiment will be described with reference to FIG. 11. In the description of the fifth embodiment, the same contents as those in the first embodiment will not be described. FIG. 11 is a flowchart showing a method of driving the vehicle display device 100 in the fifth embodiment. In the present embodiment, even when the controller 10 determines that the image display by the self-luminous display unit 30 should be adopted, image display is performed using both the self-luminous display unit 30 and the reflective display unit 40.

In step S11, the controller 10 acquires environment information indicating an environment outside the vehicle from the information acquisition unit 20. After the controller 10 acquires the environment information, the processing proceeds to step S12.

In step S12, the controller 10 determines which of image display by both the self-luminous display unit 30 and the reflective display unit 40 and image display by only the reflective display unit 40 should be adopted based on the acquired environment information. In this step, when the controller 10 determines that the image display by both the self-luminous display unit 30 and the reflective display unit 40 should be adopted depending on comparison between determination conditions and environment information recorded in advance in a memory or the like of the controller 10, the processing proceeds to step S13. On the other hand, when the controller 10 determines that the image display by only the reflective display unit 40 should be adopted depending on comparison between determination conditions and environment information recorded in advance in a memory or the like of the controller 10, the processing proceeds to step S14.

In step S13, the controller 10 performs image display using the reflective display unit 40. After the controller 10 executes the image display by the reflective display unit 40, the processing proceeds to step S14. In step S14, the controller 10 performs image display using the self-luminous display unit 30. After the controller 10 executes the image display by the self-luminous display unit 30, the processing proceeds to step S1 again. The processing of step S13 may be executed after the processing of step S14.

In step S15, the controller 10 performs image display using the reflective display unit 40. In this step, the controller 10 may perform image display only by the reflective display unit 40, or may execute both the image display by the reflective display unit 40 and the image display by the self-luminous display unit 30. After the controller 10 executes the image display using the reflective display unit 40, the processing proceeds to step S1 again.

In the present embodiment, as a result of determination processing in step S12, both the image display using the reflective display unit 40 and the image display using the self-luminous display unit 30 are executed. Therefore, even though the outside light is insufficient, a light amount of the entire display unit 50 can be secured by supplementarily using the image display by the reflective display unit 40, and the power consumption in the self-luminous display unit 30 can be reduced.

Sixth Embodiment

Next, a sixth embodiment of the present invention will be described with reference to FIGS. 12 and 13. Descriptions that are the same as those of the first embodiment will be omitted.

Figure 12A:
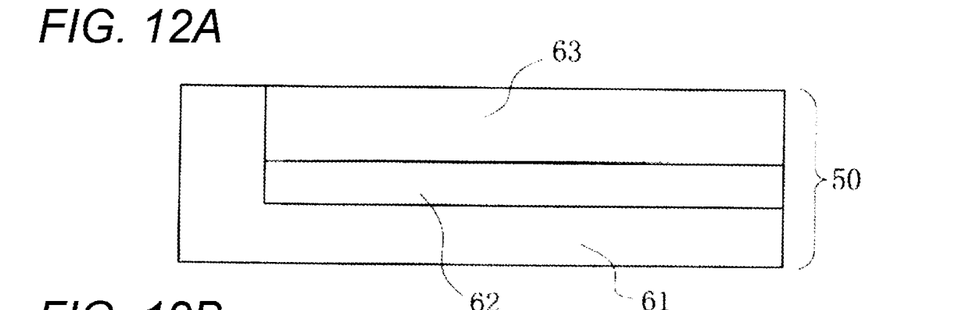
FIG. 12A schematically shows a display unit in a sixth embodiment, and shows an example of a configuration of the display unit.
Figure 12B:
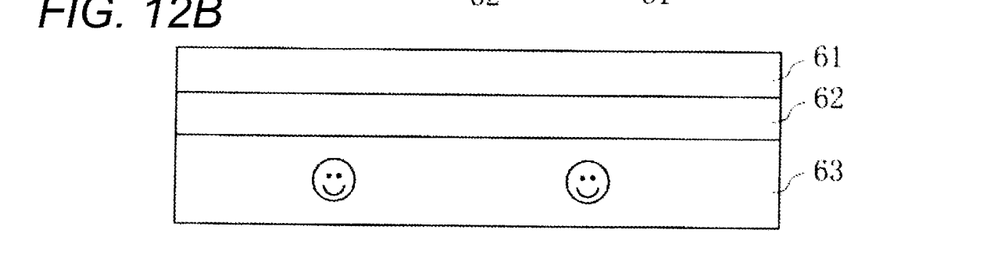
FIG. 12B schematically shows a display unit in a sixth embodiment, and shows another example of the configuration of the display unit.

FIGS. 12A and 12B are a schematic diagram showing the display unit 50 in the present embodiment, and FIG. 12A shows an example of a configuration of the display unit 50, and FIG. 12B shows another example of the display unit 50.

The third embodiment and the like describe that a part of the display unit 50 is used as a marker lamp. Here, a marker lamp such as a stop lamp or a direction indicator needs to output a luminous intensity satisfying a regulation requirement, and a self-luminous pixel 51b is used in order to ensure stable output regardless of the environment. Since the marker lamp shows braking, a vehicle width, a traveling direction, and the like of a subsequent vehicle, the marker lamp always emits light only in a specific color of a specific pixel. In addition, the marker lamp is turned on frequently during driving the vehicle. Therefore, the self-luminous pixel 51b used in the marker lamp must always output a sufficient luminous intensity, and deterioration tends to proceed as compared with other parts. The self-luminous pixels 51b may be darker than other parts due to aging deterioration depending on the situation.

Therefore, in the present embodiment, a part of the display unit 50 to be used in the marker lamp is always fixed as a marker lamp part, and the marker lamp part is constituted by only the self-luminous pixels 51a. A part of the display unit 50 to be used for purposes other than the marker lamp is configured by combining the self-luminous pixel 51a and the reflective pixel 51b, and display is performed by using the reflective pixel 51b when the vicinity of the surface of the display unit is bright, such as at daytime, and using the self-luminous pixel 51a when the vicinity of the surface of the display unit is dark, such as at night. Specifically, the part is configured as follows.

As shown in FIG. 12A, in the present embodiment, the display unit 50 is divided into a stop and tail lamp display unit 61 which is dedicated to the marker lamp, a turn signal display unit 62, and a general display unit 63 which displays contents other than the marker lamp. The stop and the tail lamp display unit 61 functions as the stop lamp and a tail lamp (vehicle width lamp), and emits light only in red, which is a functional color. The turn signal display unit 62 functions as a direction indicator, and emits light only in amber, which is a functional color. The general display unit 63 performs display for purposes other than the stop lamp, the tail lamp, and the direction indicator, and emits light in various colors fitting a display object. The stop and tail lamp display unit 61 taking on the function of the marker lamp, and the turn signal display unit 62 function as the self-luminous display unit 30, and the general display unit 63 switches a function between the self-luminous display unit 30 and the reflective display unit 40 depending on a state of the outside light.

In other words, the vehicle display device of the present embodiment includes the stop and tail lamp display unit 61, and the turn signal display unit 62, which are marker lamp parts that emit light only in necessary functional colors as the marker lamps in the self-luminous display unit 30.

FIG. 12A shows an example in which the display unit 50 is divided into a region taking on the function of the marker lamp and a region taking on general display. Further, as shown in FIG. 12B, the display unit 50 may be divided into the region taking on the fraction of the marker lamp and the region taking on general display. Further, by other methods, the display unit 50 may be divided into the region taking on the function of the marker lamp and the region taking on general display.

In the general display unit 63, as shown in FIGS. 2A and 2B before, the pixels include the self-luminous pixel 51a and the reflective pixel 51b (see FIG. 3A). The general display unit 63 includes a color filter layer 57 of three colors RGB. Regarding arrangement of colors, as schematically shown in FIG. 13C, RGB is assigned in units of sub pixels, and three colors are disposed substantially equally. By additively mixing the three colors RGB depending on the display object, light in a plurality of colors including white is emitted. Regarding the arrangement of colors, FIG. 13C is an example, and other arrangement may be used as long as the three colors are substantially equally dispersed.

On the other hand, the pixels of the stop and tail lamp display unit 61 and the turn signal display unit 62 include only the self-luminous pixel 51a. Therefore, the structure, for example, becomes a shape that does not have the reflective electrode 56 from a shape having the organic EL layer shown in FIG. 3A.

Figure 13A:
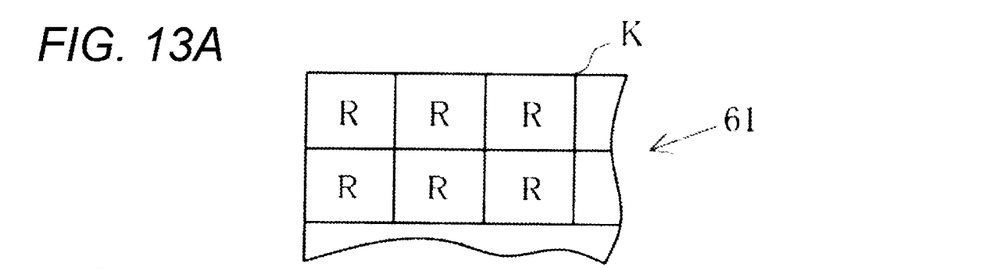
FIG. 13A schematically shows an arrangement of colors in pixels of a display unit 50 in the sixth embodiment, and shows an arrangement of colors of pixels in a stop or tail lamp display unit 61.
Figure 13B:
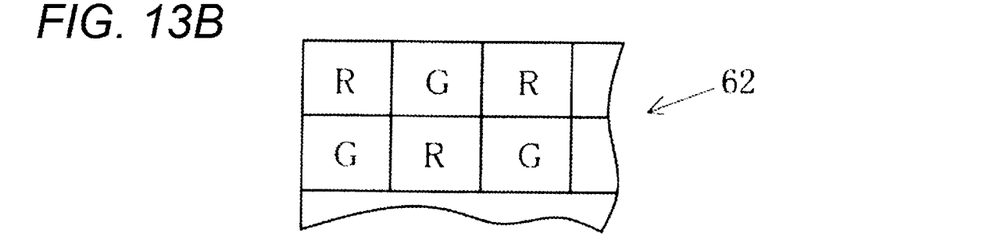
FIG. 13B schematically shows an arrangement of colors in pixels of a display unit 50 in the sixth embodiment, and shows an example of an arrangement of colors of pixels in a turn signal display unit 62.
Figure 13C:
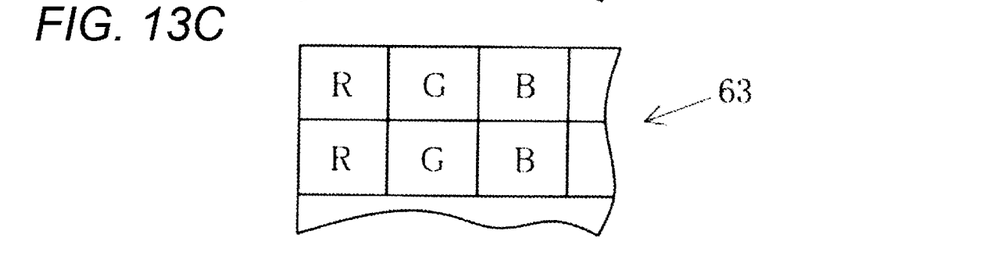
FIG. 13C schematically shows an arrangement of colors in pixels of a display unit 50 in the sixth embodiment, and shows an example of an arrangement of colors of pixels in a general display unit 63.

Since the stop and tail lamp display unit 61 always emits red light, the color filter layer 57 is only R, and as for the arrangement of colors, any of the sub pixels are R as schematically shown in FIG. 13A. Since the turn signal display unit 62 always emits amber light, the color filter layer 57 has R and G but no B. As schematically shown in FIGS. 13B, R and G are disposed alternately (in a checkered pattern) as schematically shown in FIG. 13B. FIG. 13B is an example, and other arrangements such as those in which R and G are disposed in a row unit may be used.

Since the stop and tail lamp display unit 61 and the turn signal display unit 62 are only the self-luminous pixels 51a, the color filter layer 57 is not limited to color coding as described above, and may be color-coded by light emission colors of the organic EL element. In short, the stop and tail lamp display unit 61 emits light only in R and outputs only red color, and as long as the turn signal display unit 62 emits light in R and G, mixes the two and outputs only amber color as a whole, a self-luminous display device by various commonly known organic EL elements is applicable. For example, the stop and tail lamp display unit 61 is not limited to a configuration including a plurality of pixels, and a predetermined region may include the organic EL layer in R integrally. A light emitter is not limited to the organic EL element, but may be an LED element. That is, the stop and tail lamp display unit 61 may include only the LED elements in R, and the turn signal display unit 62 may include the LED element in R and G.

In the present embodiment, when the stop lamp is turned on, the pixels constituting the stop and tail lamp display unit 61 are emitted. As shown in FIGS. 13A and 13C, the number of R per unit area K of the stop and tail lamp display unit 61 is larger than the number of R per unit area K of the general display unit 63. That is, since a density of R is high, even though luminous intensity of a sub pixel unit and one pixel unit is small, the luminous intensity per unit area K can sufficiently satisfy the regulation requirement. On the other hand, if the same display as the stop and tail lamp display unit 61 is attempted by the general display unit 63 in which the three colors RGB are disposed, since R per unit area K is a few, each of R must have a larger luminous intensity than the stop and tail lamp display unit 61. In this way, since the density of R is high in the stop and tail lamp display unit 61, the luminous intensity per unit area K that satisfies the regulation requirement can be output with a current value smaller than that of the general display unit 63 in the sub pixel unit and one pixel unit. Therefore, the current value per pixel and power consumption can be reduced, and deterioration of the self-luminous pixel 51a can be prevented.

Similarly, the number of R and G per unit area K of the turn signal display unit 62 is large, and densities of R and G of the turn signal display unit 62 are high. Therefore, a luminous intensity satisfying the regulation requirement can be ensured with a small current value, the current value per pixel can be reduced, and deterioration of the self-luminous pixel 51 can be prevented.

In addition, since the stop and tail lamp display unit 61 and the turn signal display unit 62 include only the self-luminous pixels 51a, it is possible to always output a constant luminous intensity without being affected by the outside light. On the other hand, since the general display unit 63 uses the self-luminous pixels 51a and the reflective pixels 51b at daytime and night, it is possible to reduce power consumption while improving visibility.

Although the display unit 50 including the organic EL layer is used and described as the light emitter, a transmissive display unit or the like using a back light as shown in FIG. 3B may be used.

Although the embodiments of the present invention have been described, it is needless to say that the technical scope of the present invention should not be interpreted as being limited by the description of the present embodiments. The present embodiment is merely an example, and it is appreciated by those skilled in the art that various embodiments can be changed within the scope of the invention described in the claims. The technical scope of the present invention should be determined based on the scope of the invention described in the claims and the scope of equivalents thereof.

The present application appropriately cites the contents disclosed in Japanese Patent Application No. 2017-101470 filed on May 23, 2017 and the contents disclosed in Japanese Patent Application No. 2018-024658 filed on Feb. 15, 2018.

The invention claimed is:

1. A vehicle display device mounted on a vehicle and configured to display an image to an outside of the vehicle, comprising:
   a self-luminous display configured to display an image to the outside of the vehicle by emitting light emitted from a light source to the outside of the vehicle;
   a reflective display configured to display an image to the outside of the vehicle by reflecting light from the outside of the vehicle on a reflective member;
   an information acquisition unit, including at least one sensor, configured to acquire environment information indicating an environment outside the vehicle;
   a controller, including a processor, configured to switch between image display by the self-luminous display and image display by the reflective display based on the acquired environment information; and
   wherein the self-luminous display and the reflective display are configured to display a same image on the vehicle display device, and
   wherein the light source is positioned closer towards an interior of the vehicle display device than the reflective member.

2. The vehicle display device according to claim 1, wherein the information acquisition unit is a communication unit configured to receive the environment information by wireless or wired communication.

3. The vehicle display device according to claim 1, wherein the environment information includes information relating to luminance of outside light emitted from the outside of the vehicle to a display surface of the vehicle display device.

4. The vehicle display device according to claim 1, wherein the self-luminous display is configured to emit light of a predetermined color and includes a marker lamp part functioning as a marker lamp.

5. A method of controlling a vehicle display device mounted on a vehicle and configured to display an image to an outside of the vehicle, comprising:

displaying an image using a self-luminous display configured to display an image to the outside of the vehicle by emitting light emitted from a light source to the outside of the vehicle;

displaying an image using a reflective display configured to display an image to the outside of the vehicle by reflecting light on a reflective member from the outside of the vehicle;

acquiring environment information indicating an environment outside the vehicle using at least one sensor; and switching between image display by the self-luminous display and image display by the reflective display based on the acquired environment information;

wherein the self-luminous display and the reflective display are configured to display a same image on the vehicle display device, and wherein the light source is positioned closer towards an interior of the vehicle display device than the reflective member.

6. A computer-readable non-transitory storage medium for storing a program that causes a computer to execute a process, the process comprising:

displaying an image using a self-luminous display configured to display an image to an outside of a vehicle by emitting light emitted from a light source to the outside of the vehicle;

displaying an image using a reflective display configured to display an image to the outside of the vehicle by reflecting light on a reflective member from the outside of the vehicle;

acquiring environment information indicating an environment outside the vehicle using at least one sensor; and switching between image display by the self-luminous display and image display by the reflective display based on the acquired environment information;

wherein the self-luminous display and the reflective display are configured to display a same image on the vehicle display device, and wherein the light source is positioned further from the outside of the vehicle than the reflective member.

7. The vehicle display device according to claim 1, wherein the information acquisition unit is a temperature sensor.

8. The vehicle display device according to claim 1, wherein the information acquisition unit is a luminance sensor.

9. The vehicle display device according to claim 1, wherein the information acquisition unit is a global positioning system sensor.

10. The vehicle display device according to claim 1, wherein the reflective member further comprises a plurality of reflective electrodes.

11. The vehicle display device according to claim 10, wherein the plurality of reflective electrodes are positioned with a gap in between each reflective electrode and the light source is positioned between the gaps.

* * * * *